Jan. 12, 1971   R. A. HERZOG   3,553,767
HIDE PEELER

Filed Aug. 6, 1968   2 Sheets-Sheet 1

INVENTOR
RAYMOND A. HERZOG

BY  *J. Warren Kinney Jr.*

ATTORNEY

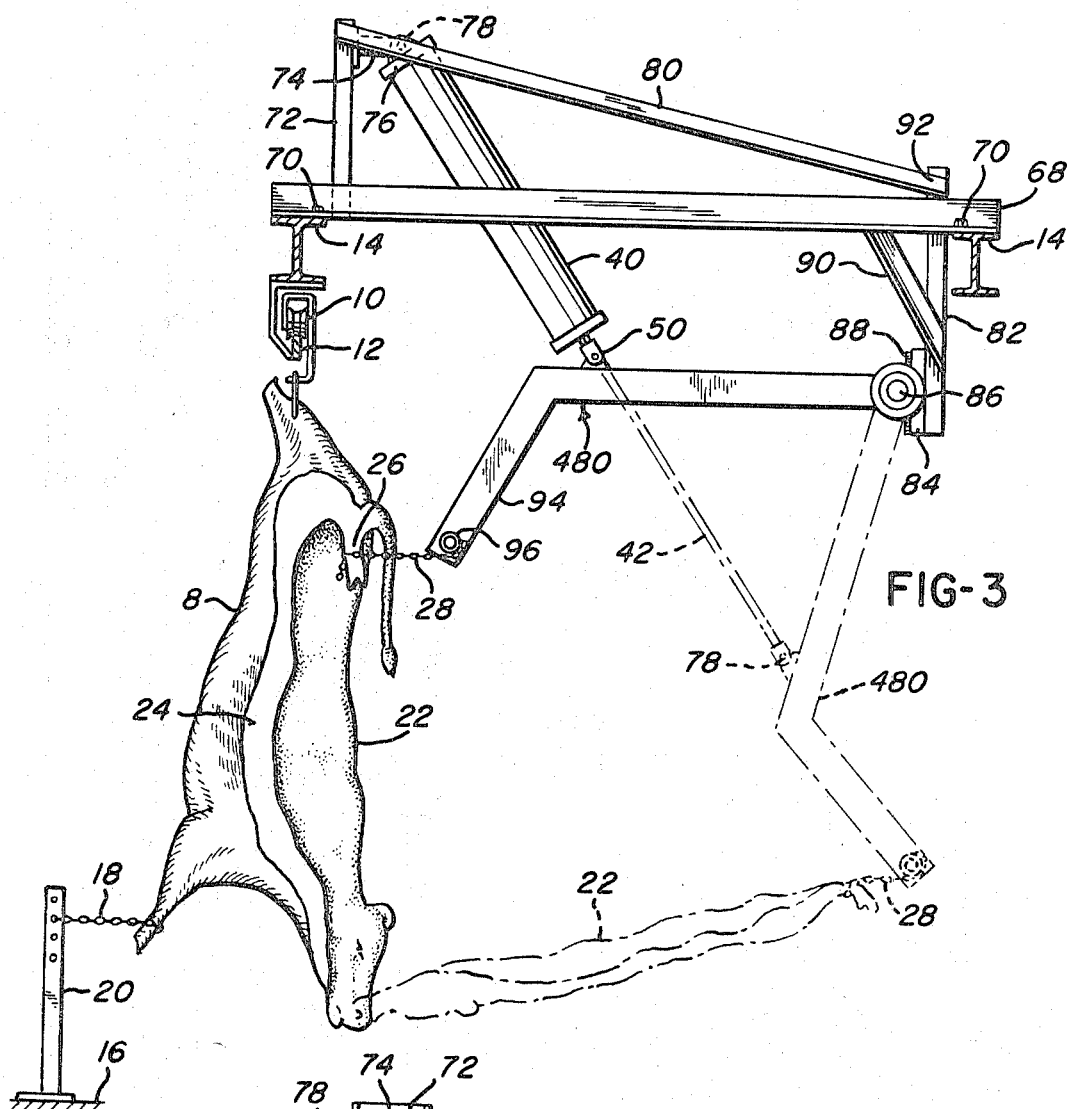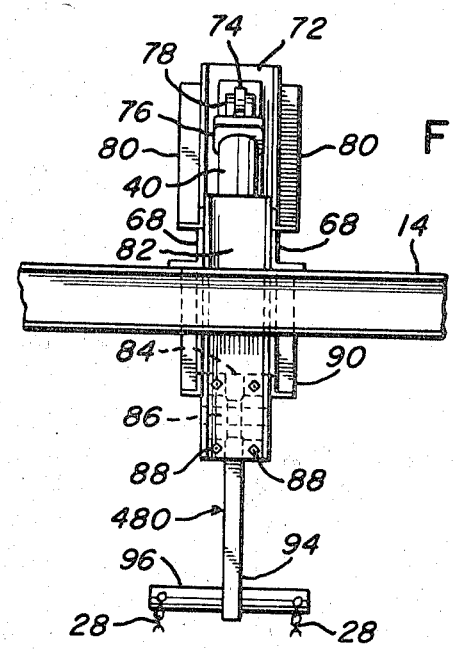

United States Patent Office 3,553,767
Patented Jan. 12, 1971

3,553,767
HIDE PEELER
Raymond A. Herzog, Cincinnati, Ohio, assignor to The Cincinnati Butchers' Supply Company, Cincinnati, Ohio, a corporation of Ohio
Filed Aug. 6, 1968, Ser. No. 750,632
Int. Cl. A22b 5/16
U.S. Cl. 17—21                                                    13 Claims

ABSTRACT OF THE DISCLOSURE

The hide peeler boom acts to pull the hide initially parallel to the backbone, with a gradual change of direction of pull occurring until the pull finally assumes approximate perpendicu'arity to the backbone as the hide is stripped from the head and nose of the animal to terminate the peeling operation. The apparatus is fluid pressure actuated, and operates simply, economically, and safely to perform a superior hide peeling operation.

---

This invention relates to a hide peeler, or device for removing hides from animals following an initial hide-pulling operation.

In the meat packing industry, carcasses of meat animals are customarily dressed with the carcasses suspended by both hind legs from a moving conveyor or gravity rail. As one step of the procedure, the hide of the animal is slit lengthwise along the belly, and is pulled outwardly from both sides of the carcass by means of a mechanical hide-puller while the carcass is suspended by the moving conveyor. The hide-pulling step usually leaves the hide attached to the carcass along the backbone from neck to tail, and necessitates performance of the additional step of completely severing or peeling the hide from the backbone region.

For a proper understanding of the invention, it is necessary to distinguish the terms "hide-pulling" and "hide peeling," as employed in the industry. Hide-pulling refers to that procedure which involves slitting the hide lengthwise along the belly, slicing the hide from the skin at both sides of the slit forming opposed flaps of hide, and then grasping the flaps and stripping the hide laterally of the carcass and along the sides thereof, short of complete disassociation along the backbone region.

The term "hide-peeling" refers to the step of disassociating the hide completely from the carcass along the backbone, subsequently to the hide pulling operation, by peeling the hide lengthwise from the carcass.

An object of the invention is provide simplified and improved apparatus for performing a hide-peeling operation upon animals suspended from an overhead conveyor, or rail.

Another object of the invention is to provide an improved hide peeler which peels the hide from the rump area progressively in the direction of the animal's head, with a changing angle of pull most favorable to perfection in the complete removal of the hide without delay or interruption, and without damage to the hide or the carcass.

Another object of the invention is to provide fluid-operated apparatus for facilitating and expediting the hide-peeling operation, with emphasis upon safety and ease of operation.

The foregoing and other objects are attained by the means described herein and illustrated upon the accompanying drawings, in which:

FIG. 3 is a side elevation of a ceiling-mounted type of hide-peeler embodying the improvements of the present invention.

FIG. 4 is a rear elevation looking from right to left upon FIG. 3.

Figure 1:
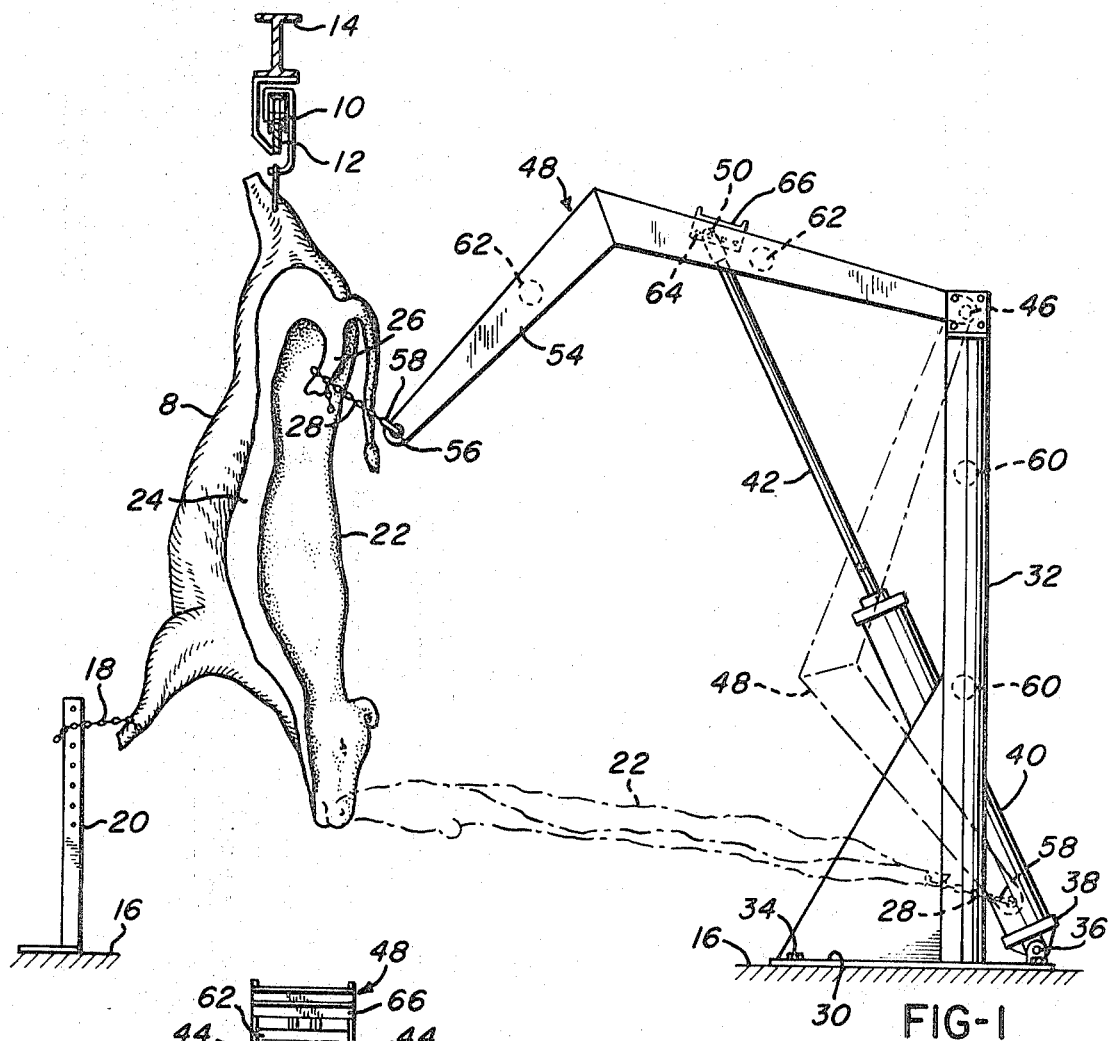
FIG. 1 is a side elevation of the improved hide-peeler, showing its operative relationship to a carcass suspended from a conveyor, the hide-peeler being floor-mounted.

In the drawings, 8 denotes an animal carcass suspended by its hind legs from a trolley 10 that rides along a track 12. The track is suspended from a series of beams 14 or other overhead supports arranged usually beneath the ceiling of a building, so that the head of the animal is spaced to some extent above the floor 16 of the building. In the performance of the hide-peeling operation, it is desirable to temporarily anchor one or both forelegs of the animal to the floor, as by means of a shackle 18 and a rigid upstanding post 20 fixed relative to the floor. The shackle may be secured to the post at various elevations thereon, depending upon the length of the carcass.

As was explained in the introduction, the hide 22 is partly removed in advance of the hide-peeling operation performed by the instant apparatus, as evidenced by the flaps 24 appearing at opposite sides of the carcass, and the end flap 26 provided at the region of the hindquarters. The hindquarters flap 26 constitutes the starting point of the hide-peeling operation which, in the present instance, progresses toward and terminates at the nose of the animal.

It may here be noted that by means of a shackle member 28 atached to the hindquarters flap 26, the hide peeling commences with a downward pull which substantially parallels the backbone, and then veers gradually away from the line of the backbone until finally, as the hide leaves the neck and head of the animal, the line of pull of the shackle member 28 is approximately at right angles to the backbone and to the anchor post 20. This method of peeling has proven superior to other methods wherein the line of pull is in one direction only, with the peeling terminating at the rump or hindquarters of the animal. The presently improved method assures the performance of a clean and complete peel, without tearing of the hide or blemishing the skin at locations which might cause depreciation of the value of the finished meat product.

In addition to the advantages stated above, the improved method results in de-hiding the head concurrently with de-hiding the body of the animal, thereby to eliminate the extra handling required when the head is peeled separately as a detached part. These and other advantages will be recognized and appreciated by persons skilled in the art to which the present invention appertains.

Figure 2:
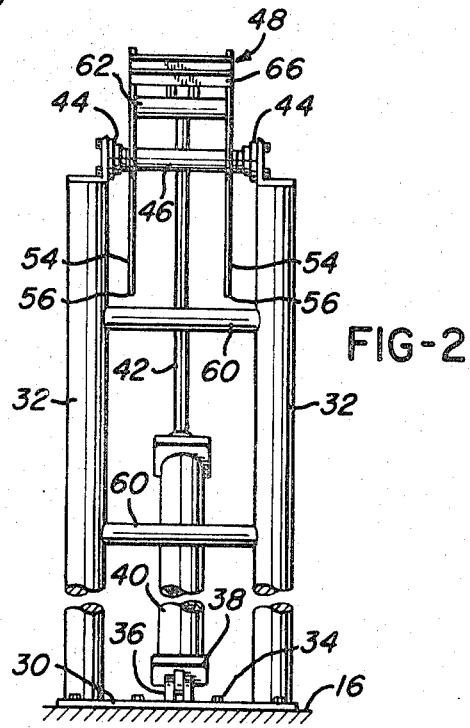
FIG. 2 is a rear elevation of a floor mounted type of hide-peeler of FIG. 1.

The hide-peeling apparatus may be floor-mounted, as in FIGS. 1 and 2, or it may sometimes be mounted upon overhead supports as in FIGS. 3 and 4, for example. When floor-mounted, the apparatus may comprise a pedestal having a base 30 and a pair of upright posts or standards 32 fixed thereon, the base to be secured to floor 16 in any acceptable manner, as by means of bolts 34. The base carries also a hinge 36 for pivotally mounting upon the base the end cap 38 of a fluid motor or pneumatic or hydraulic cylinder 40. The piston rod of the cylinder is denoted 42, and may have a stroke approximating four feet, more or less.

The upper ends of posts 32 may be provided with trunnions 44 for the support of a horizontal shaft 46 which rockingly supports a boom or the like 48. Boom 48 may be lowered about shaft 46 with force, by introducing fluid under pressure into cylinder 40 to retract the piston rod 42, which has its outer end pivoted at 50 upon the boom. To elevate the boom, fluid under pressure is fed into the cylinder in the opposite direction, thereby to project the piston rod with the force necessary to elevate the boom into the initial or starting position of FIG. 1.

The lowering movement of boom 48 is to be controlled as to speed, so that the peeling of the hide may progress without tearing the hide, the skin, or the flesh of the carcass. If the boom is made sufficiently heavy, the lowering thereof may be controlled wholly or partly by governing the rate of fluid exhaust from cylinder 40 as the piston rod descends into the cylinder. It is considered preferable, however, to utilize a double-acting cylinder construction, wherein both the in-stroke and the out-stroke of the piston rod are fluid pressure driven.

The boom 48 desirably includes a down-turned end portion consisting preferably of a pair of spaced parallel arms 54, 54 (FIG. 2), each having a free end 56, 56 to which a shackle such as 28 may be anchored, as by means of a quick-detachable hook 58. If the carcass is trimmed to present two hindquarter flaps 26, one at each side of the backbone, two shackles 28 may be employed, one being attached to each flap 26. The two shackles may be hooked one each to an arm extremity 56, preparatory to peeling off the hide.

FIG. 1 clearly indicates that the initial stage of downward advancement of boom 48 exerts a pull on the hide in a direction generally parallel to the backbone and toward the head of the animal; then as the boom advancement continues, the pull gradually changes direction onto a line which is substantially perpendicular to the line of the backbone, and during this latter phase of the pull the hide is peeled very effectively from the head of the animal. In the final stage of peeling, the hide assumes the broken line position 22, FIG. 1, in substantial parallelism with the floor. Upon complete severance of the hide from the animal's head, an attendant may conveniently release the shackle from the boom at hook 58, and then return the boom to the starting position shown by full lines in FIG. 1, in readiness for a subsequent peeling operation.

The reference characters 60 indicate reinforcing struts maintaining the posts 32, 32 in rigid spaced relationship, and at 62, 62 similar reinforcing struts maintain the boom elements in rigid spaced parallelism. The swing of the boom about shaft 46 may be adjusted at pivot 50, by relocating said pivot at various distances from shaft 46, in selected ones of the several holes 64 provided in a head member 66 fixed to the boom. By relocating the piston rod pivot 50 in selected holes 64 of the head, the range of swing of the boom may be adjusted to accommodate the apparatus to different kinds or sizes of carcasses.

As will be understood, the shackle 18 restrains one or both forelegs of the animal throughout the hide peeling operation, and is subject to release upon completion of the operation so that the trolley 10 may convey the carcass to an advanced location along rail 12 for further processing.

In the alternative arrangement illustrated by FIGS. 3 and 4, the hide peeler is mounted overhead rather than upon the floor 16. In this example there is provided a horizontal support means in the form of a pair of structural iron members 68, 68, here shown as angle irons, spanning a pair of ceiling beams 14, 14 to which the members 68, 68 are bolted or otherwise attached, as at 70. An upright mounting plate 72 may be fixed to members 68, 68 near one end thereof, to carry a hinge member 74 upon which the end cap 76 of cylinder 40 may be pivoted at 78. A pair of angle irons 80, 80 may be employed to brace the plate 72.

Near the ends of members 68, 68 opposite the mounting plate 72, may be fixed a depending boom support member 82 herein shown as a wide channel iron, the lower end portion of which carries a fixed bearing block 84 to support the boom pivot 86. Block 84 may be secured to support member 82 by means of bolts or other fasteners 88. The numerals 90, 90 indicate braces having opposite ends fixed to members 82 and 68. Braces 80, 80 may be welded or otherwise fixed to member 82 at 92.

The boom, designated 480 in FIGS. 3 and 4, is shown as a single bar of metal having a down-turned end portion 94 the free end of which carries a fixed crossbar 96. The opposite ends of the crossbar carry the shackles 28, which may either be fixed thereon or detachably connected as at 58 of FIG. 1. The shackles 28 are adapted to grip the hindquarters flaps 26 of the carcass, for peeling the hide from the carcass in the direction of the animal head as piston rod 42 progressively advances from power cylinder 40. The power cylinder of FIGS. 3 and 4 may be the same as that of FIGS. 1 and 2.

In the FIG. 3 modification, the pivot 78 may be adjustably fixed at various locations along the length of boom 480, to vary the reach of the boom for the hide peeling of animals of different sizes. For the purpose, means equivalent to the member 66 of FIG. 1 may be employed, if desired. The nature of the peeling action in the device of FIGS. 3 and 4, does not differ substantially from the disclosure of FIGS. 1 and 2, and possesses amongst other advantages, the saving of valuable floor space.

The booms 48 and 480 may be considered interchangeable in the structures of FIGS. 1 and 3, and are subject to considerable modification within the scope of accepted engineering practice. The motor means 40 may consist of a pneumatic cylinder or a hydraulic cylinder, having conventional controls whereby an operator may selectively effect extension or retraction of the piston rod for swinging the boom downwardly or upwardly as required.

It should be understood that the term fluid operated and/or fluid motor as used in the specification and claims is used broadly to include and comprehend the use of air as a fluid media.

What is claimed is:

1. A hide peeler for removing from a suspended animal carcass a hide which is attached to the carcass mainly along the backbone region, and unattached at a flap located near the hindquarters region, said hide peeler comprising: an elongate boom having a free end and a pivot end; means supporting said pivot end for arcuate swinging of the free end of the boom from an upper limit to a lower limit of travel; means for temporarily shackling the hindquarters flap to the free end of the boom; and power means for swinging the boom at a controlled rate of speed from the upper limit of travel to the lower limit of travel, movement of said pivot end of said boom in a downward direction from said upper limit of travel to said lower limit of travel causing the shackle to peel the hide from the hindquarters region progressively from the tail to the head of an animal carcass.

2. The hide peeler as specified by claim 1, wherein the pivot for the boom is located at an elevation such that the free end of the boom initially moves substantially vertically downwardly from the upper limit of travel, and moves substantially horizontally away from the carcass in a final stage of movement toward the lower limit of travel.

3. The hide peeler as specified by claim 1, wherein is included means for support thereof upon a ceiling structure.

4. The hide peeler as specified by claim 1 wherein is included means for support thereof upon a building floor.

5. The hide peeler as specified by claim 1 wherein the shackling means on the free end of the boom are two in number, to shackle each of two hindquarters flaps present on the hide.

6. The hide peeler as specified by claim 2, wherein the shackling means on the free end of the boom are two in number, to shackle each of two hindquarters flaps present on the hide.

7. The hide peeler as specified by claim 1, in combination with means for detachably securing one or both of the forelegs of the animal carcass against movement of the carcass in the direction of advancement of the boom to its lower limit of travel.

8. The hide peeler as specified by claim 2, in combination with means for restraining the carcass against substantial horizontal movement with the final stage of the boom movement.

9. The hide peeler as specified by claim 8, wherein the shackling means on the free end of the boom are two in number, to shackle each of two hindquarters flaps provided on the hide.

10. The hide peeler as specified by claim 2, and wherein the power means comprises a fluid motor in the form of a cylinder including a piston rod extendable from the cylinder and retractable therein, said cylinder having a base end and said piston rod having a free end; a stationary support member; means mounting the base end of the cylinder upon said support member; and pivot means connecting the free end of the piston rod with the boom at a location remote from the pivot end of the boom.

11. The hide peeler as specified by claim 10, wherein the pivot means last mentioned is adjustable toward and from the pivot end of the boom.

12. The hide peeler as specified by claim 11, wherein the boom includes a down-turned end portion upon which the free end of the boom is located.

13. The hide peeler as specified by claim 12, wherein a transverse crossbar is fixed at the free end of the boom, said crossbar having opposite ends each carrying a hindquarters flap shackling means.

References Cited

UNITED STATES PATENTS

| | | | |
|---|---|---|---|
| 3,187,377 | 6/1965 | Hager et al. | 17—21 |
| 3,443,275 | 5/1969 | Radtke | 17—21 |

FOREIGN PATENTS

| | | | |
|---|---|---|---|
| 1,346,412 | 11/1963 | France | 17—21 |

LUCIE H. LAUDENSLAGER, Primary Examiner